(12) United States Patent
Xing

(10) Patent No.: US 11,750,035 B2
(45) Date of Patent: Sep. 5, 2023

(54) WIRELESS POWER TRANSFER DEVICE WITH ELECTROMAGNETIC INTERFERENCE (EMI) SUPPRESSION

(71) Applicant: Shenzhen Qitian Taiyi Technology Co., Ltd., Guangdong (CN)

(72) Inventor: Yitao Xing, Guangdong (CN)

(73) Assignee: SHENZHEN QITIAN TAIYI TECHNOLOGY CO., LTD., Guangdong (CN)

( * ) Notice: Subject to any disclaimer, the term of this patent is extended or adjusted under 35 U.S.C. 154(b) by 17 days.

(21) Appl. No.: 17/379,029

(22) Filed: Jul. 19, 2021

(65) Prior Publication Data

US 2021/0344230 A1 Nov. 4, 2021

Related U.S. Application Data

(63) Continuation of application No. PCT/CN2020/072926, filed on Jan. 19, 2020.

(30) Foreign Application Priority Data

Jan. 19, 2019 (CN) .......................... 201920087512.4

(51) Int. Cl.
| | | |
|---|---|---|
| *H02J 50/12* | (2016.01) | |
| *H02J 50/80* | (2016.01) | |
| *H02J 50/70* | (2016.01) | |
| *H02M 1/00* | (2006.01) | |
| *H02J 7/02* | (2016.01) | |
| *H02M 1/44* | (2007.01) | |
| *H04B 5/00* | (2006.01) | |
| *H04B 15/02* | (2006.01) | |

(52) U.S. Cl.
CPC ................ *H02J 50/12* (2016.02); *H02J 7/02* (2013.01); *H02J 50/70* (2016.02); *H02J 50/80* (2016.02); *H02M 1/0064* (2021.05); *H02M 1/44* (2013.01); *H04B 5/0037* (2013.01); *H04B 5/0087* (2013.01); *H04B 15/02* (2013.01)

(58) Field of Classification Search
CPC ................................. H02J 50/12; H02J 50/70
See application file for complete search history.

(56) References Cited

U.S. PATENT DOCUMENTS

| | | | | | |
|---|---|---|---|---|---|
| 2010/0270867 A1* | 10/2010 | Abe | ........................ | H02J 50/12 | |
| | | | | 307/104 | |
| 2011/0102125 A1* | 5/2011 | Tamura | .................... | H01F 27/34 | |
| | | | | 336/232 | |

(Continued)

FOREIGN PATENT DOCUMENTS

| | | |
|---|---|---|
| CN | 1941541 A | 4/2007 |
| CN | 102593957 A | 7/2012 |

(Continued)

*Primary Examiner* — Daniel Kessie
(74) *Attorney, Agent, or Firm* — MUNCY, GEISSLER, OLDS & LOWE, P.C.

(57) ABSTRACT

A wireless power transfer device with EMI suppression includes a power conversion circuit board, a wireless power transfer coil group assembly and an eddy current damper (ECD) with a stable potential. The ECD is close to the wireless power transfer coil group assembly and is connected to a low-alternating current (AC) impedance direct current (DC) plane of the power conversion circuit board through a conductor.

15 Claims, 7 Drawing Sheets

(56) References Cited

U.S. PATENT DOCUMENTS

2014/0191568 A1     7/2014  Partovi
2016/0285318 A1 *   9/2016  Maniktala ............. H02J 50/402
2016/0315502 A1 *  10/2016  Xing ....................... H02J 50/10
2018/0212477 A1 *   7/2018  Misawa .................. H02J 50/90

FOREIGN PATENT DOCUMENTS

CN     103715781 A    4/2014
CN     105448490 A    3/2016
CN     108461264 A    8/2018
CN     109698558 A    4/2019
WO    2015197443 A1  12/2015

* cited by examiner

WIRELESS POWER TRANSFER DEVICE WITH ELECTROMAGNETIC INTERFERENCE (EMI) SUPPRESSION

CROSS-REFERENCE TO RELATED APPLICATIONS

This application is a continuation of International Application No. PCT/CN2020/072926, filed on Jan. 19, 2020, which claims the benefit of priority from Chinese Patent Application No. 201920087512.4, filed on Jan. 19, 2019. The content of the aforementioned applications, including any intervening amendments thereto, are incorporated herein by reference.

TECHNICAL FIELD

This application relates to wireless energy transfer, and more particularly to a wireless power transfer device with EMI (electromagnetic interference) suppression, in which the mechanical structure of a high-frequency power cable is designed to the alternating-current (AC) conduction bandwidth to achieve the EMI suppression, and an eddy current damper (ECD) with a stable electric potential is designed to be electrically connected to a stable electric plane of a power conversion circuit board and to be arranged beside the wireless power transfer coil group to achieve the EMI suppression.

BACKGROUND

Electricity has become indispensable in our daily life. A technique enabling the energy transmission between a power source and an electrical appliance without electrical connection is called wireless power transfer technology, which renders the life more convenient and safe. With respect to the existing wireless power transfer devices, such as a wireless charging device for a handheld device disclosed in Chinese patent application No. 200510030239.4 and a wireless charging transmitter and receiver and a wireless charging device disclosed in Chinese patent application No. 201110020352.X, a direct current (DC) is generally converted into a high-frequency alternating current (AC), and then the AC is used to drive a wireless energy output coil and transfer alternating electromagnetic energy to a wireless charging input coil, and finally the sensed AC is converted into the DC.

However, it's a common concern in prevailing wireless charging products that a lot of heat will be generated in the conversion of the DC into the AC by the power conversion circuit board of the wireless charging transmitter. Chinese patent application No. 201410004299.8 disclosed a new wireless charging transmission device, in which the power conversion circuit is separated from the wireless power transfer coil group assembly through a high-frequency AC cable to keep the exothermic power conversion circuit board away from wireless charging range, so as to greatly reduce the heat and the increase of temperature in the wireless charging range and further achieve the significant reduction of a thickness of the wireless charging transmitting module.

Unfortunately, the wireless charging transmission device disclosed by Chinese patent application No. 201410004299.8 suffers serious electromagnetic interference (EMI), which is mainly caused by the following two aspects. Firstly, a power conversion circuit module is electrically connected to the transfer coil through a high-frequency AC transmission line, while the high-frequency AC transmission line is long and the DC is isolated between the power conversion circuit module and the transfer coil, causing the transfer coil to form a high-frequency and low-impedance AC load relative to the power conversion circuit module. Therefore, when the power conversion circuit module generates the wide-spectrum AC required for wireless charging and transmits it to the transfer coil, energy of the high-frequency part (i.e., the harmonics of the AC circuit other than the fundamental waveform) will not be suppressed, thereby causing serious EMI. Secondly, the power conversion circuit module is often directly connected to a DC power supply or a power adapter, such that when power elements in the power conversion circuit module are switched on and off, the generated EMI noise is transmitted to the power supply without being filtered, causing serious EMI pollution.

With respect to the wireless charging transmission device disclosed in Chinese patent application No. 201410004299.8, a shielding layer is provided on the high-frequency AC transmission line, and is electrically connected to a shielding network of the power conversion circuit module and the transfer coil. However, it fails to disclose the specific implementation of the shielding network and shielding purpose and effect. Therefore, Chinese patent application No. 201410004299.8 fails to suggest how to effectively overcome and suppress the EMI in actual application.

It has been demonstrated that in the technical solutions that the power conversion circuit module and the transfer coil are spaced apart, and then electrically connected through a high-frequency AC transmission line, the EMI is mainly composed of current interference caused by power of the harmonics of the AC circuit other than the fundamental waveform of a lower-frequency and current interference caused by transient switching of a higher-frequency course by the transient switch of the power conversion circuit. In view of this, by introducing an electromagnetic signal filter, an EMI noise suppression circuit and a potential stabilization module, the EMI can be effectively suppressed. However, there are still no related wireless power transfer devices on the market.

SUMMARY

An object of this application is to provide a wireless power transfer device with EMI suppression to effectively solve the above-mentioned problems.

Technical solutions of this disclosure are described as follows.

This application provides a wireless power transfer device with EMI suppression, comprising:
a power conversion circuit board;
a wireless power transfer coil group assembly; and
an eddy current damper (ECD) with a stable electric potential;
wherein the power conversion circuit board is connected to the wireless power transfer coil group assembly through a high-frequency power cable; the ECD is close to the wireless power transfer coil group assembly; and the ECD is connected to a low-alternating current (AC) impedance direct current (DC) plane of the power conversion circuit board through a conductor.

In an embodiment, the high-frequency power cable comprises at least one basic unit for low-loss transmission of high-frequency AC; and a space of each of the at least one basic unit constitutes an inductance-capacitance low-pass filter.

In an embodiment, each of the at least one basic unit comprises at least one forward high-frequency low-loss wire and at least one reverse high-frequency low-loss wire; a spatial structure between the at least one forward high-frequency low-loss wire and the at least one reverse high-frequency low-loss wire is a parallel structure, a twisted structure, a stranded structure, a knitted structure, a spiral structure or a combination thereof; the at least one forward high-frequency low-loss wire and the at least one reverse high-frequency low-loss wire are respectively connected in series to the wireless power transfer coil group assembly; the number of the at least one forward high-frequency low-loss wire is different from that of the at least one reverse high-frequency low-loss wire; the at least one forward high-frequency low-loss wire and the at least one reverse high-frequency low-loss wire cling to each other to form a capacitor; and the inductance-capacitance low-pass filter formed by the space of each of the at least one basic unit is a distributed inductance-capacitance low-pass filter configured to suppress electromagnetic interference (EMI).

In an embodiment, each of the at least one basic unit comprises at least one forward high-frequency low-loss wire, a magnetic conductive material and at least one reverse high-frequency low-loss wire; a spatial structure between the at least one forward high-frequency low-loss wire and the magnetic conductive material and the at least one reverse high-frequency low-loss wire is a parallel structure, a twisted structure, a stranded structure, a knitted structure, a spiral structure or a combination thereof; the at least one forward high-frequency low-loss wire and the at least one reverse high-frequency low-loss wire are respectively connected in series to the wireless power transfer coil group assembly; the at least one forward high-frequency low-loss wire and the at least one reverse high-frequency low-loss wire cling to each other to form a capacitor; and the inductance-capacitance low-pass filter formed by the space of each of the at least one basic unit is a distributed inductance-capacitance low-pass filter configured to suppress EMI.

In an embodiment, the magnetic conductive material has electrical conductivity.

In an embodiment, each of the at least one basic unit comprises a forward high-frequency low-loss wire, a conductive material and a reverse high-frequency low-loss wire; a spatial structure between the forward high-frequency low-loss wire, the conductive material and the reverse high-frequency low-loss wire is a parallel structure, a twisted structure, a stranded structure, a knitted structure, a spiral structure or a combination thereof; the forward high-frequency low-loss wire and the reverse high-frequency low-loss wire are respectively connected in series to the wireless power transfer coil group assembly; the forward high-frequency low-loss wire and the reverse high-frequency low-loss wire cling to each other to form a capacitor; the conductive material is configured to increase a capacitance of the capacitor; and the inductance-capacitance low-pass filter formed by the space of each of the at least one basic unit is a distributed inductance-capacitance low-pass filter configured to suppress EMI.

In an embodiment, the conductive material has soft magnetic properties.

In an embodiment, the wireless power transfer coil group assembly comprises a coil and a magnetic conductive material to conduct the alternating magnetic field generated by the wireless charging magnetic conductive material for guiding wireless charging; and the coil, the magnetic conductive material and the ECD are provided adjacent to each other.

In an embodiment, the magnetic conductive material is provided above the ECD; the coil is provided above the magnetic conductive material; and the coil, the magnetic conductive material and the ECD are approximately coaxially arranged;

the maximum projection length D of the ECD along an axial line of the coil is greater than or equal to ⅛ of the maximum projection length d of the coil; and a distances between a geometric center of the ECD and the axial line of the coil is less than or equal to the maximum projection length d of the coil.

In an embodiment, the ECD adopts a sector-shaped structure with the approximately the same axis as the coil; the coil is provided below the ECD; the magnetic conductive material is provided below the coil; the coil, the magnetic conductive material and the ECD are arranged coaxially; and a maximum projection length D of the ECD along an axial line of the coil is greater than or equal to ⅛ of a maximum projection length d of the coil; and a distance s between a geometric center of the ECD and the axial line of the coil is less than or equal to the maximum projection length d of the coil.

In an embodiment, the ECD adopts a sector-shaped structure with the same approximately the axis as the coil; the coil is provided above the ECD; the magnetic conductive material is provided below the ECD; and the coil, the magnetic conductive material and the ECD are approximately coaxially provided; and a maximum projection length D of the ECD along an axial line of the coil is greater than or equal to ⅛ of a maximum projection length d of the coil; and a distance s between a geometric center of the ECD and the axial line of the coil is less than or equal to the maximum projection length d of the coil.

In an embodiment, the ECD is a long-line conductive material; the ECD is wound on or clings to a side of the wire/wires to form coil; the magnetic conductive material is closely provided below the ECD and the coil; and a length L of the ECD is greater than or equal to ⅛ of a length of the wire of the coil.

In an embodiment, the wireless power transfer device further comprises at least one filter circuit board; the at least one filter circuit board is electrically connected to the power conversion circuit board, the wireless power transfer coil group assembly and the high-frequency power cable; the at least one filter circuit board is configured to remove high-frequency EMI noise of wireless charging to suppress the EMI; the at least one filter circuit board is electrically connected between the power conversion circuit board and the high-frequency power cable; the at least one filter circuit board is electrically connected between a plurality of adjacent high-frequency power cables; and the at least one filter circuit board is electrically connected between the wireless power transfer coil group assembly and the high-frequency power cable.

In an embodiment, the coil comprises at least one sub-coil; the power conversion circuit board is provided with a bridge circuit; each of the at least one sub-coil is provided with two leads for electrically connecting with the bridge circuit; an output terminal of the bridge circuit is electrically connected to the at least one sub-coil in series through a capacitor; one lead of each of the at least one sub-coil is electrically connected to the bridge circuit; and the other lead of each of the at least one sub-coil is provided on an outer side of a projection of each of the at least one sub-coil along an axis and is connected to the capacitor.

Compared to the prior art, this disclosure has the following beneficial effects.

With respect to the wireless power transfer device provided herein, a high-frequency AC cable with a special structure is provided to increase transmission impedance of a transient switching frequency and the harmonics of the transient switching frequency of the power conversion circuit and suppress electromagnetic interference signal of the transient switching frequency and the harmonics of the transient switching frequency of the power conversion circuit. In addition, an ECD with a stable potential, which is electrically connected to a low-AC impedance DC plane of the power conversion circuit, is provided for a wireless power transfer coil group assembly such that a potential of the wireless power transfer coil group assembly is stabilized, and the harmonics of the AC circuit other than the fundamental waveform of the power conversion circuit is suppressed, greatly weakening the related EMI. As a consequence, the disclosure greatly increases the high-frequency AC impedance and reduces the EMI signal, thereby effectively solving the problem caused by EMI.

DETAILED DESCRIPTION OF EMBODIMENTS

The present disclosure will be further described in detail with reference to the embodiments and the accompanying drawings to make technical solutions, features, objectives and advantages of the present disclosure better understood. It should be understood that the embodiments are only illustrative, and are not intended to limit the scope of the application.

It should be understood that any replacements, modifications and changes made by those skilled in the art without departing from the spirit of this application shall fall within the protection scope of this application defined by the appended claims. In order to promote the understanding of this application, some specific details are described below, and those skilled in the art can still understand and implement the application without the description of these details.

Embodiment 1

Figure 1:
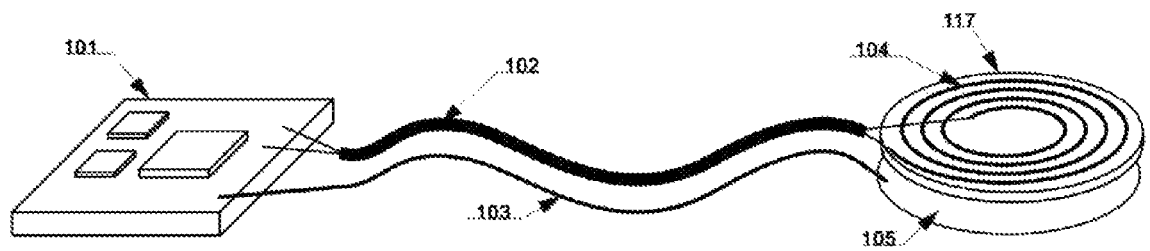
FIG. 1 schematically shows an overall schema of a wireless power transfer device with EMI suppression according to Embodiment 1 of the present disclosure.

As shown in FIG. 1, an embodiment of this disclosure provides a wireless power transfer device with EMI suppression, including a power conversion circuit board 101, a wireless power transfer coil group assembly including a coil 104 and a magnetic conductive material 117, a high-frequency power cable 102, a conductor 103 and an eddy current damper (ECD) 105 with a stable potential. The power conversion circuit board 101 is provided with a low-alternating current (AC) impedance direct current (DC) plane 119. The wireless power transfer coil group assembly is configured to realize conversion between high-frequency AC used for wireless charging and a high-frequency alternating magnetic field. The wireless power transfer coil group assembly includes the coil 104.

The ECD 105 is electrically connected to the low-AC impedance DC plane 119 of the power conversion circuit board 101 through the conductor 103. In this embodiment, the low-AC impedance DC plane 119 is a ground plane, a DC plane, or a ground plane or any DC plane that has low AC impedance.

When needed to be connected to the power conversion circuit board 101, the conductor 103 can be directly electrically connected to a fixed electrical plane or is electrically connected to the fixed electrical plane through a circuit. Since the alternating-current impedance between the conductor 103 and the low-AC impedance DC plane 119 is extremely low, a high-frequency AC frequency band of the electromagnetic interference (EMI) noises is equivalent to being directly connected to the fixed electrical plane.

The power conversion circuit board 101 will generate EMI noises during the operation. The EMI noises include the harmonics of the AC circuit other than the fundamental waveform with a lower frequency and transient switching current electromagnetic noises generated when the power-switching element on the power conversion circuit board 101 with a higher frequency is switched on and off.

The magnetic conductive material 117 is provided beside the coil 104 to guide a magnetic field generated by the coil 104.

Embodiment 2

Figure 2:
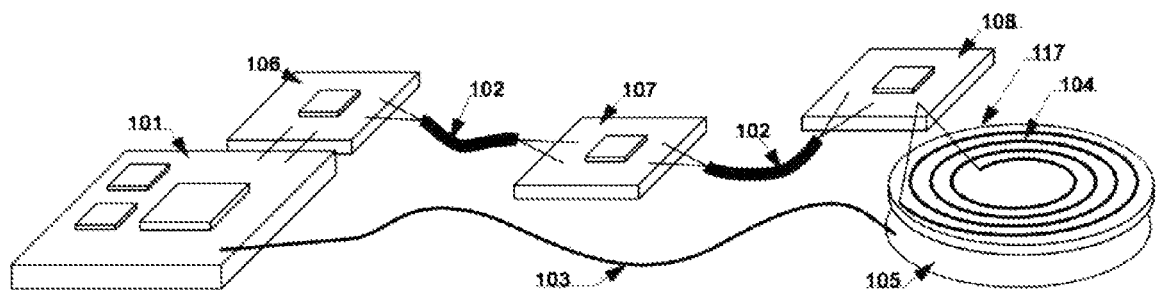
FIG. 2 schematically shows an overall schema of a wireless power transfer device with EMI suppression according to Embodiment 2 of the present disclosure.

Referring to an embodiment illustrated in FIG. 2, a wireless power transfer device with EMI suppression includes a power conversion circuit board 101, a coil 104, a high-frequency power cable 102, a conductor 103, an ECD 105 with a stable potential, a first filter circuit 106, a second filter circuit 107 and a third filter circuit 108. The first filter circuit 106, the second filter circuit 107 and the third filter circuit 108 is electrically connected to the power conversion circuit board 101 and the coil 104 through the high-frequency power cable 102.

The ECD 105 is electrically connected to a low-AC impedance DC plane 119 of the power conversion circuit board 101 through the conductor 103. In this embodiment, the low-AC impedance DC plane 119 is a ground plane, a DC plane, or a ground plane or any DC plane that has low AC impedance. The first filter circuit 106, the second filter circuit 107 and the third filter circuit 108 are configured to remove and suppress interference signals of electromagnetic noises. In this embodiment, a magnetic conductive material 117 is provided beside the coil 104 to guide a magnetic field generated by the coil 104.

Embodiment 3

Figure 3:
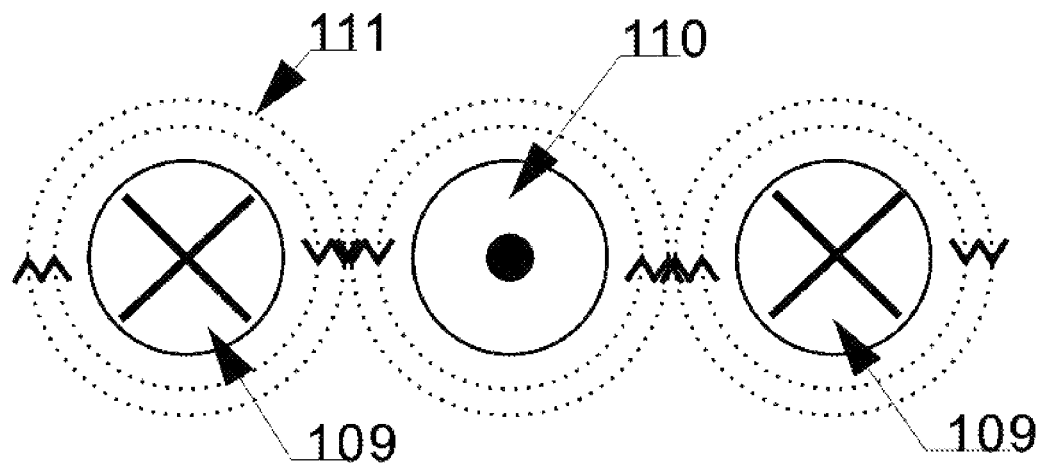
FIG. 3 schematically shows a cross section of a basic unit of a high-frequency power cable according to Embodiment 3 of the present disclosure.

Referring to FIG. 3, a cross section of a basic unit of a high-frequency power cable 102 is presented. The schema of a wireless power transfer device provided herein is basically the same as that in Embodiments 1 and 2 except that the cross section of the basic unit of the high-frequency power cable 102 is presented. The high-frequency power cable 102 is composed of one or more basic unit for low-loss transmission of high-frequency AC. Each basic unit includes N forward high-frequency low-loss wires 110 and M reverse high-frequency low-loss wires, where N is not equal to M.

In this embodiment, two reverse high-frequency low-loss wires 109 are symmetrically provided at left and right sides of each forward high-frequency low-loss wire 110, so that the high-frequency power cable 102 has capacitance and inductance to form a capacitance-inductance filter with a certain cut-off frequency, thereby suppressing EMI in a high-frequency part.

Considering that an intensity of a magnetic induction 111 is related to a spatial arrangement of a coil pair, the spatial structure of the forward high-frequency low-loss wire and the reverse high-frequency low-loss wire provided herein, including distribution on a horizontal plane, can enhance the inductance and further improve the performance of suppressing the EMI.

Embodiment 4

Figure 4A:
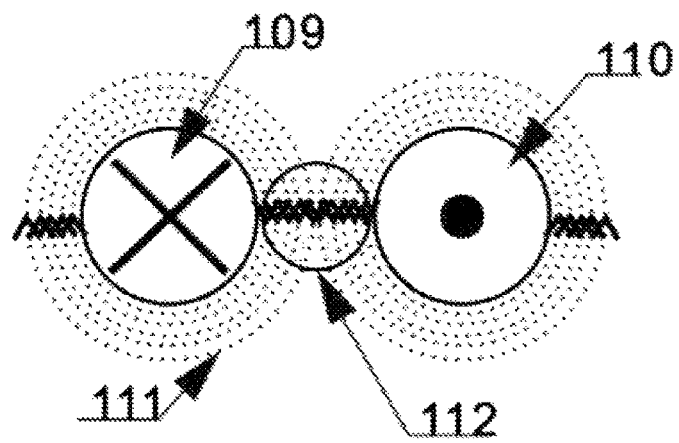
FIG. 4A schematically shows a cross section of a basic unit of a high-frequency power cable according to Embodiment 4 of the present disclosure.

As shown in FIG. 4A, a cross section of a basic unit of a high-frequency power cable 102 is presented. The schema of a wireless power transfer device provided herein is basically the same as that in the above embodiments except that the cross section of the basic unit of the high-frequency power cable 102 is presented. The high-frequency power cable 102 is composed of one or more basic unit for low-loss transmission of high-frequency AC. Each basic unit includes a forward high-frequency low-loss wire 110, a magnetic conductive material 112 and a reverse high-frequency low-loss wire 109.

In this embodiment, the magnetic conductive material 112 is provided between the forward high-frequency low-loss wire 110 and the reverse high-frequency low-loss wire 109, so that the high-frequency power cable 102 has capacitance and inductance to form a capacitance-inductance filter with a lower cut-off frequency, thereby further suppressing EMI.

Figure 4B:
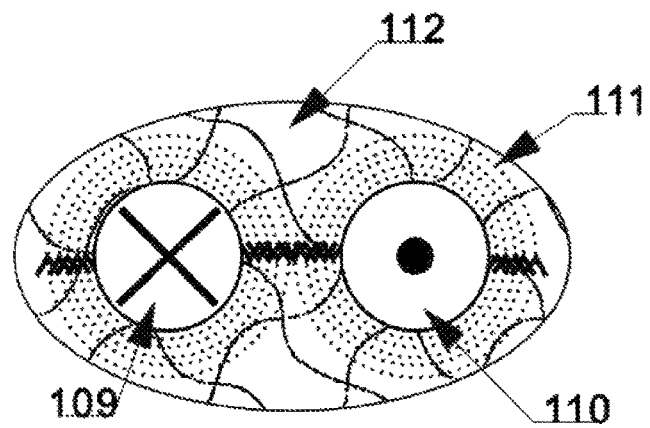
FIG. 4B schematically shows a cross section of another basic unit of the high-frequency power cable according to Embodiment 4 of the present disclosure.

Referring to an embodiment shown in FIG. 4B, the magnetic conductive material 112 has conductive properties and can significantly increase the capacitance of the high-frequency power cable 102, thereby further lower the cut-off frequency and enhancing the effect of suppressing the EMI.

The magnetic conductive material 112 can be used as the conductor 103 to electrically connect the ECD 105 and the power conversion circuit board 101. Considering that the intensity of the magnetic induction 111 is related to a shape and a magnetic relative permeability of the magnetic conductive material 112, in this embodiment, the magnetic conductive material 112 completely wraps the forward high-frequency low-loss wire 110 and the reverse high-frequency low-loss wire 109, such that the inductance is enhanced, thereby further improving the performance of suppressing the EMI.

Embodiment 5

Figure 5A:
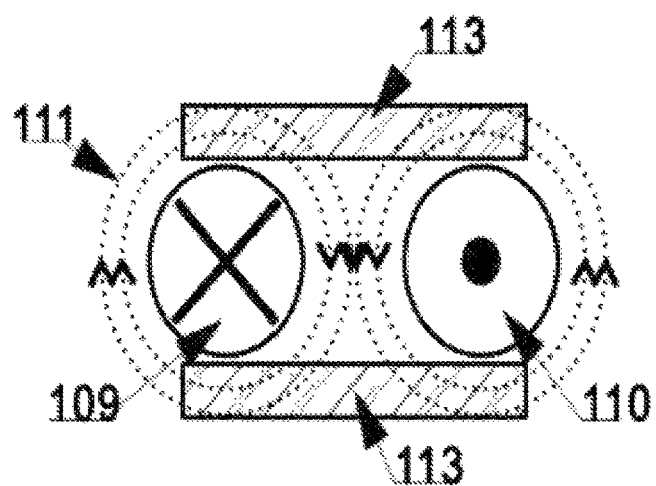
FIG. 5A schematically shows a cross section of a basic unit of a high-frequency power cable according to Embodiment 5 of the present disclosure.
Figure 5B:
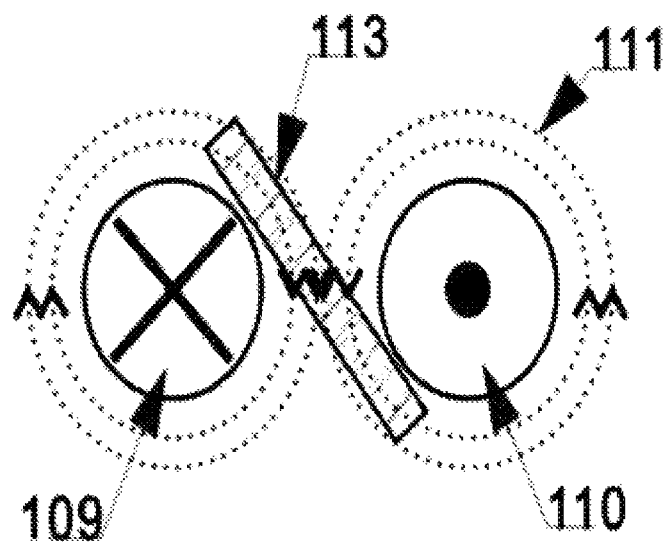
FIG. 5B schematically shows a cross section of another basic unit of the high-frequency power cable according to Embodiment 5 of the present disclosure.
Figure 5C:
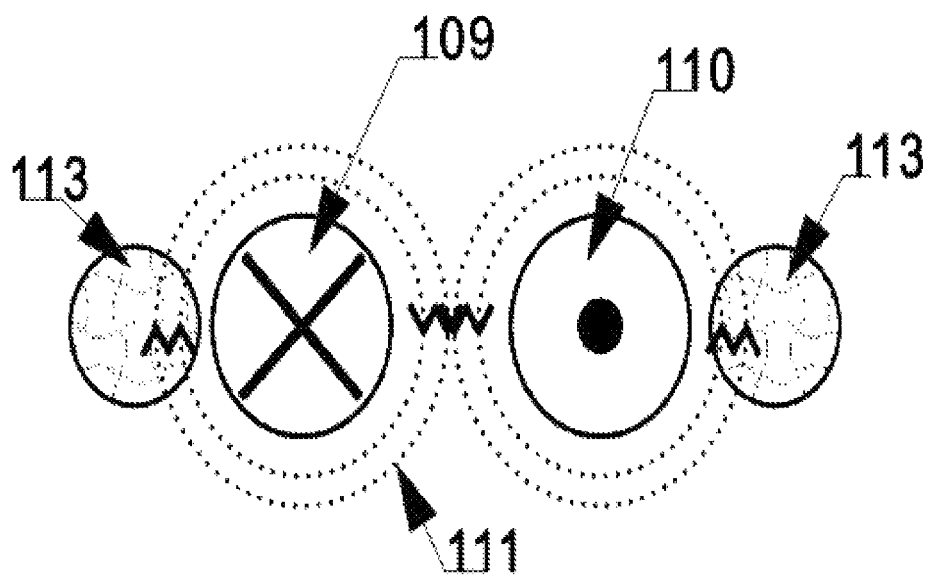
FIG. 5C schematically shows a cross section of another basic unit of the high-frequency power cable according to Embodiment 5 of the present disclosure.

As shown in FIGS. 5A-5C, a cross section of a basic unit of a high-frequency power cable 102 is presented. The schema of a wireless power transfer device provided herein is basically the same as that in Embodiments 1 except that the cross section of the basic unit of the high-frequency power cable 102 is presented. The high-frequency power cable 102 includes one or more basic units for low-loss transmission of high-frequency AC. Each basic unit includes a forward high-frequency low-loss wire 110, a conductive material 113 and a reverse high-frequency low-loss wire 109.

As shown in FIG. 5A, the conductive material 113 is provided at the same side of the forward high-frequency low-loss wire 110 and the reverse high-frequency low-loss wire 109.

As shown in FIG. 5B, the conductive material 113 is obliquely provided between opposite sides of the forward high-frequency low-loss wire 110 and the reverse high-frequency low-loss wire 109.

As shown in FIG. 5C, the conductive material 113 is provided at a side of the forward high-frequency low-loss wire 110 away from the reverse high-frequency low-loss wire 109 and at a side of the reverse high-frequency low-loss wire 110 away from the forward high-frequency low-loss wire 109.

Such arrangements of the conductive material 113 enable the high-frequency power cable 102 to have capacitance and inductance. In addition, the conductive material 113 increases the capacitance of the high-frequency power cable 102 to form a capacitance-inductance filter with a lower cut-off frequency, thereby further suppressing EMI.

In the case of having soft magnetic properties, the conductive material 113 can be used as the conductor 103 to electrically connect the ECD 105 and the power conversion circuit board 101, which greatly increases the inductance of the high-frequency power cable 102, thereby further lower the cut-off frequency of the capacitance-inductance filter and suppressing the EMI.

Embodiment 6

Figure 6:
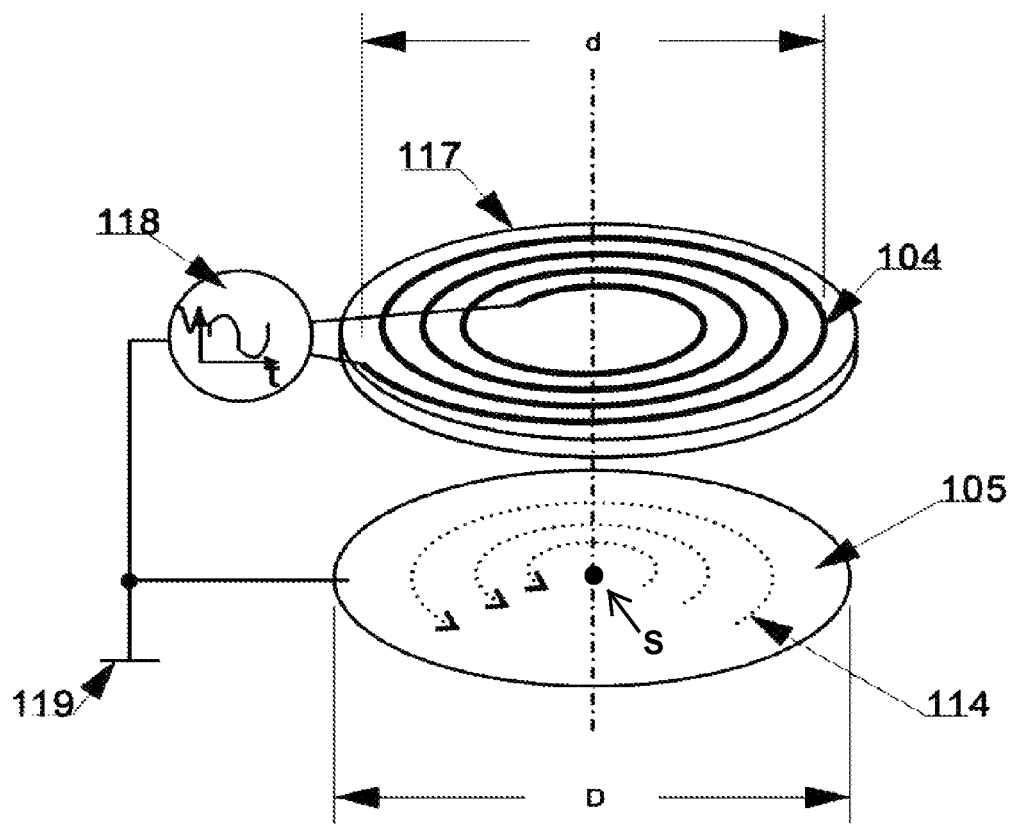
FIG. 6 schematically shows an overall schema of an eddy current damper (ECD) with a stable potential according to Embodiment 6 of the present disclosure.
Figure 7:
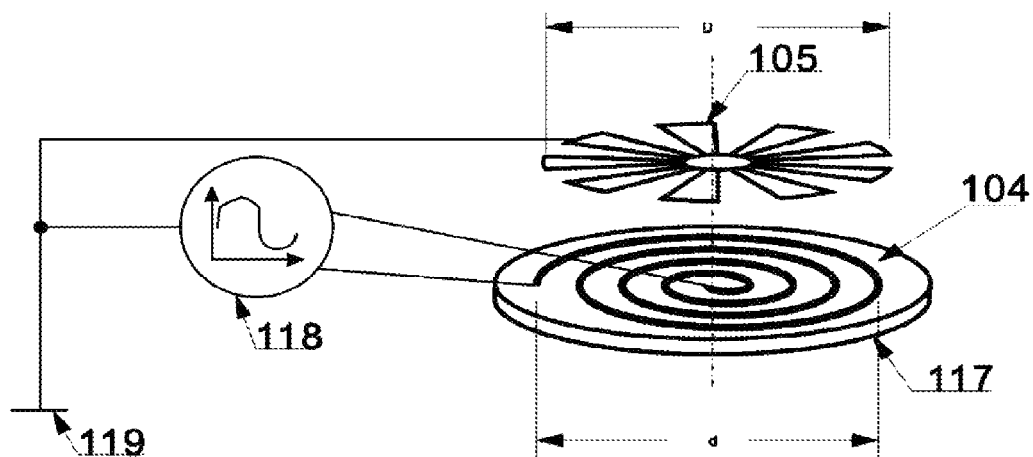
FIG. 7 schematically shows an overall schema of an ECD with a stable potential according to Embodiment 7 of the present disclosure.

An embodiment in FIG. 6 provides an ECD 105 with a stable potential, which is the same as the ECD 105 used in the above embodiments. The ECD 105 is made of a conductive material. In this embodiment, a magnetic conductive material 117 is provided above the ECD 105, and a coil 104 is provided above the magnetic conductive material 117. The coil 104, the magnetic conductive material 117 and the ECD 105 are approximately coaxially provided adjacent to each other.

A maximum projection length D of the ECD 105 along an axial line of the coil 104 is greater than or equal to ⅛ of a maximum projection length d of the coil 104. A distance s between a geometric center of the ECD 105 and the axial line of the coil 104 is less than or equal to the maximum projection length d of the coil 104.

At the same time, the ECD 105 is designed into a shape or size, which hardly induces the fundamental frequency AC, so as to avoid absorbing the energy of the fundamental frequency AC to generate heat.

In this embodiment, a higher-frequency part in the AC is often the harmonics part of the fundamental frequency of a high-frequency AC for the wireless power transfer. The fundamental frequency of the high-frequency AC for the wireless power transfer is generally referred to as the fundamental frequency. When a wide-band AC 118 is input into the coil 104, the higher-frequency part in the wide-band AC 118 will generate an eddy current positively correlated with the frequency in the ECD 105, generating an eddy current 114 on the ECD 105 and generating a reverse alternating magnetic field to suppress the current of the higher-frequency part in the AC. As a consequence, the higher-frequency current is lowered and the EMI is suppressed.

Considering that a direct current (DC) is isolated and the AC is conducted between a power conversion circuit board 101 and the coil 104, and the conduction impedance is negatively correlated with the frequency, the coil 104 has a floating electric potential and plays a role as a high-frequency load circuit with extremely low impedance with respect to the power conversion circuit board 101 connected to a stable power supply. Therefore, when the wide-band AC 118 is input into the coil 104, the coil 104 will allow the higher-frequency current in the AC to be conducted, thereby generating serious EMI.

When the ECD 105 with stable potential is electrically connected to the low-AC impedance DC plane 119 of the power conversion circuit board 101 (the low-AC impedance DC plane 119 can be a ground plane, a stable plane or a ground plane or a stable plane connected through a circuit with extremely low impedance relative to the AC), the coil 104 is controlled at a stable electric potential to greatly increase the high-frequency impedance of the coil 104. Therefore, the current of the higher-frequency part in the AC is greatly suppressed to effectively reduce the EMI.

Embodiment 7

An embodiment in FIG. 6 provides an ECD 105 with a stable potential, which is the same as the ECD 105 in the above embodiments. The ECD 105 is made of a conductive material. In this embodiment, the ECD 105 adopts a sector-shaped schema with approximately the same axis as the coil 104. The coil 104 is provided below the ECD 105, and the magnetic conductive material 117 is provided below the coil 104. The coil 104, the magnetic conductive material 117 and the ECD 105 are approximately coaxially provided adjacent to each other.

A maximum projection length D of the ECD 105 along an axial line of the coil 104 is greater than or equal to ⅛ of a maximum projection length d of the coil 104. A distance s between a geometric center of the ECD 105 and the axial line of the coil 104 is less than or equal to the maximum projection length d of the coil 104.

At the same time, the ECD 105 is designed into a shape or size, which hardly induces the fundamental frequency AC, so as to avoid absorbing the energy of the fundamental frequency AC to generate heat.

In this embodiment, a higher-frequency part in the AC is often the harmonics part of the fundamental frequency of a high-frequency AC for the wireless power transfer. The fundamental frequency of the high-frequency AC for the wireless power transfer is generally referred to as the fundamental frequency. When a wide-band AC 118 is input into the coil 104, the higher-frequency part in the wide-band AC 118 will generate an eddy current positively correlated with the frequency in the ECD 105, generating an eddy current 114 on the ECD 105 and generating a reverse alternating magnetic field to suppress a current of the higher-frequency part in the AC. As a consequence, the higher-frequency current is lowered and the EMI is suppressed.

Considering that a DC is isolated and the AC is conducted between a power conversion circuit board 101 and the coil 104, and the conduction impedance is negatively correlated with the frequency, the coil 104 has a floating electric potential and plays a role as a high-frequency load circuit with extremely low impedance with respect to the power conversion circuit board 101 connected to a stable power supply. Therefore, when the wide-band AC 118 is input into the coil 104, the coil 104 will allow the higher-frequency current in the AC to be conducted, thereby generating serious EMI.

When the ECD 105 with stable potential is electrically connected to the low-AC impedance DC plane 119 of the power conversion circuit board 101 (the low-AC impedance DC plane 119 can be a ground plane, a stable plane or a ground plane or a stable plane connected through a circuit with extremely low impedance relative to the AC), the coil 104 is controlled at a stable electric potential to greatly increase the high-frequency impedance of the coil 104. Therefore, the current of the higher-frequency part in the AC is greatly suppressed to effectively reduce the EMI.

Embodiment 8

Figure 8:
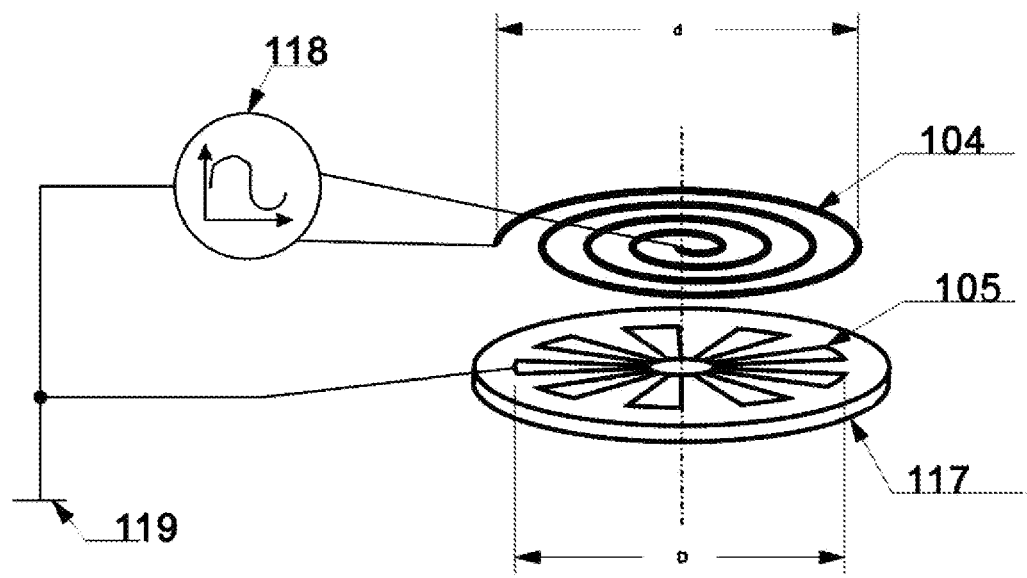
FIG. 8 schematically shows an overall schema of an ECD with a stable potential according to Embodiment 8 of the present disclosure.

An embodiment in FIG. 8 provides an ECD 105 with a stable potential, which is the same as the ECD 105 used in the above embodiments. The ECD 105 is made of a conductive material. In this embodiment, the ECD 105 adopts a sector-shaped schema with the same axis as the coil 104. The coil 104 is provided above the ECD 105, and the magnetic conductive material 117 is provided below the ECD 105 with the stable potential. The coil 104, the magnetic conductive material 117 and the ECD 105 are approximately coaxially provided adjacent to each other.

A maximum projection length D of the ECD 105 along an axial line of the coil 104 is greater than or equal to ⅛ of a maximum projection length d of the coil 104. The ECD 105 with the stable potential is fixed between the coil 104 and the magnetic conductive material 117. A distance s between a geometric center of the ECD 105 and the axial line of the coil 104 is less than or equal to the maximum projection length d of the coil 104.

At the same time, the ECD 105 is designed into a shape or size, which hardly induces the fundamental frequency AC, so as to avoid absorbing the energy of the fundamental frequency AC to generate heat.

In this embodiment, the ECD 105 with the stable potential is provided between the coil 104 and the magnetic conductive material 117.

a higher-frequency part in the AC is often the harmonics part of the fundamental frequency of a high-frequency AC for the wireless power transfer. The fundamental frequency of the high-frequency AC for the wireless power transfer is generally referred to as the fundamental frequency. When a wide-band AC 118 is input into the coil 104, the higher-frequency part in the wide-band AC 118 will generate an eddy current positively correlated with the frequency in the ECD 105, generating an eddy current 114 on the ECD 105 and generating a reverse alternating magnetic field to suppress a current of the higher-frequency part in the AC. As a consequence, the higher-frequency current is lowered and the EMI is suppressed.

Considering that a DC is isolated and the AC is conducted between a power conversion circuit board 101 and the coil 104, and the conduction impedance is negatively correlated with the frequency, the coil 104 has a floating electric potential and plays a role as a high-frequency load circuit with extremely low impedance with respect to the power conversion circuit board 101 connected to a stable power supply. Therefore, when the wide-band AC 118 is input into the coil 104, the coil 104 will allow the higher-frequency current in the AC to be conducted, thereby generating serious EMI.

When the ECD 105 with stable potential is electrically connected to the low-AC impedance DC plane 119 of the power conversion circuit board 101 (the low-AC impedance DC plane 119 can be a ground plane, a stable plane or a ground plane or a stable plane connected through a circuit with extremely low impedance relative to the AC), the coil 104 is controlled at a stable electric potential to greatly increase the high-frequency impedance of the coil 104. Therefore, the current of the higher-frequency part in the AC is greatly suppressed to effectively reduce the EMI.

Embodiment 9

Figure 9:
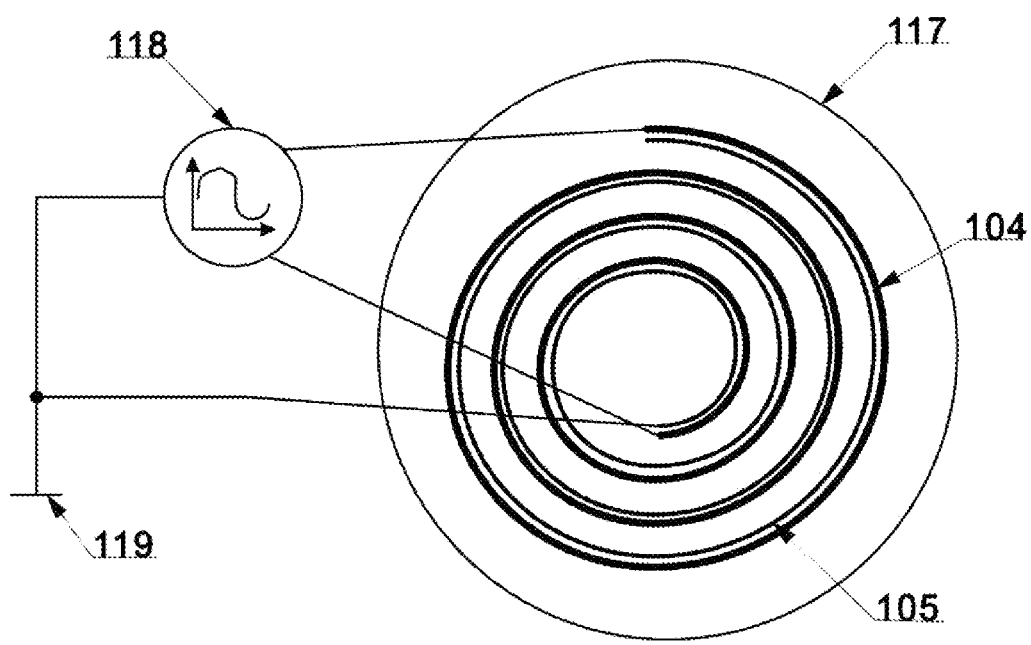
FIG. 9 schematically shows an overall schema of an ECD with a stable potential according to Embodiment 9 of the present disclosure.

An embodiment in FIG. 9 provides an ECD 105 with a stable potential, which is the same as the ECD 105 used in the above embodiments. The ECD 105 is long-line conductive material. The ECD 105 is wound on or clings to a side of wire/wires of coil 104. The magnetic conductive material 117 is closely provided below the ECD 105 and the coil 104.

A length L of the ECD 105 with the stable potential is greater than or equal to ⅛ of a length of the wire of the coil 104. When a wide-band AC 118 is input into the coil 104, the higher-frequency part in the wide-band AC 118 will generate an eddy current positively correlated with the frequency in the ECD 105, generating an eddy current 114 on the ECD 105 and generating a reverse alternating magnetic field to suppress a current of the higher-frequency part in the AC. As a consequence, the higher-frequency current is lowered and the EMI is suppressed.

At the same time, considering that a DC is isolated and the AC is conducted between a power conversion circuit board 101 and the coil 104, and the conduction impedance is negatively correlated with the frequency, the coil 104 has a floating electric potential and plays a role as a high-frequency load circuit with extremely low impedance with respect to the power conversion circuit board 101 connected to a stable power supply.

In this embodiment, a higher-frequency part in the AC is often the harmonics part of the fundamental frequency of a high-frequency AC for the wireless power transfer. The fundamental frequency of the high-frequency AC for the wireless power transfer is generally referred to as the fundamental frequency. When the wide-band AC 118 is input into the coil 104, the coil 104 will allow the higher-frequency current in the AC to be conducted, thereby generating serious EMI.

When the ECD 105 with stable potential is electrically connected to the low-AC impedance DC plane 119 of the power conversion circuit board 101 (the low-AC impedance DC plane 119 can be a ground plane, a stable plane or a ground plane or a stable plane connected through a circuit with extremely low impedance relative to the AC), the coil 104 is controlled at a stable electric potential to greatly increase the high-frequency impedance of the coil 104. Therefore, the current of the higher-frequency part in the AC is greatly suppressed to effectively reduce the EMI.

Embodiment 10

Figure 10:
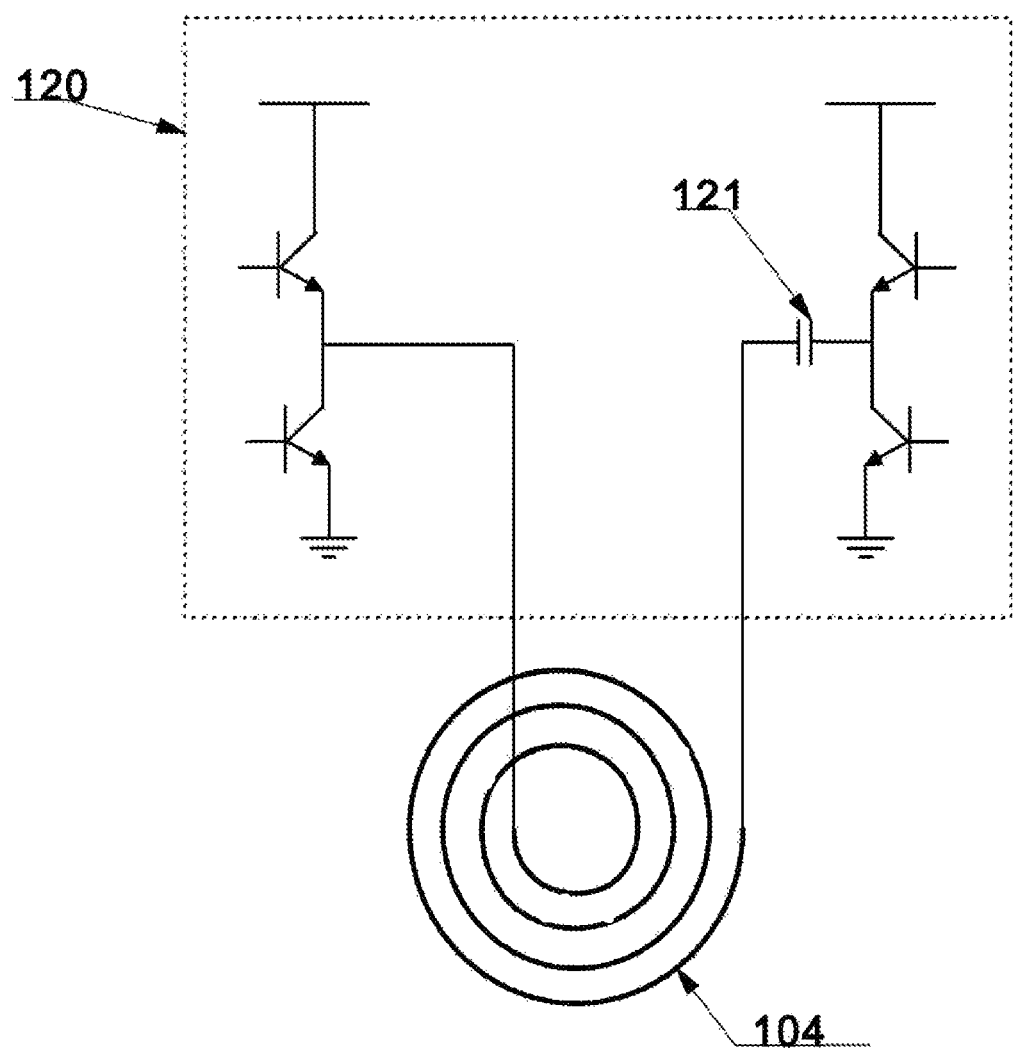
FIG. 10 schematically shows an electric connection mode of a coil according to Embodiment 10 of the present disclosure.

An embodiment in FIG. 10 provides an electric connection mode of a coil 104, which is the same as that of the coil 104 used in the above embodiments. A bridge circuit 120 is used to produce a wireless charging AC on the power conversion circuit board 101. At the same time, a capacitor 121 is connected between the bridge circuit 120 and the coil 104 in series in order to avoid rapid saturation of the coil 104 and conduction of direct current.

The coil 104 is provided with two or more leads, and a sub-coil has two leads. One lead of the sub-coil is electrically connected to the bridge circuit 120. The other lead of the sub-coil is provided on an outer side of a projection of the sub-coil along an axis and is connected to the capacitor 121, so as to achieve a better effect of suppressing EMI.

Figure 11:
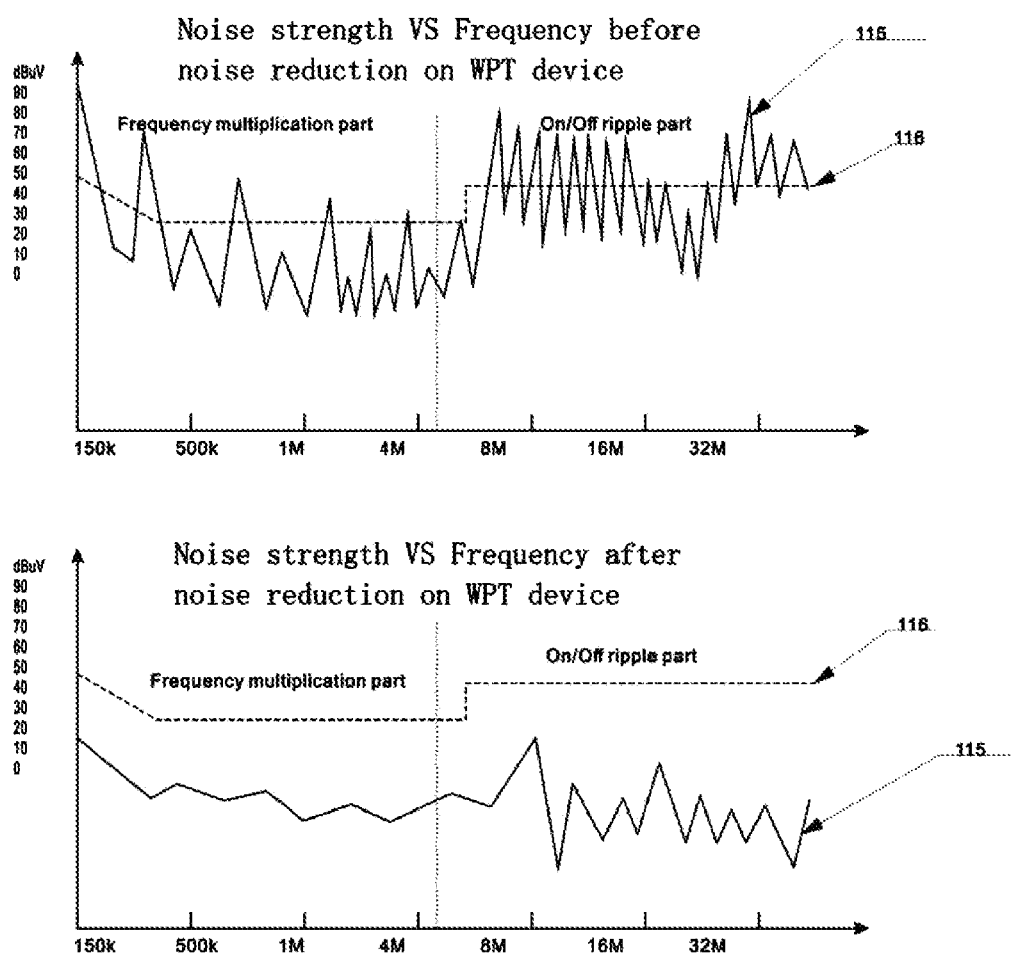
FIG. 11 schematically shows comparison between frequency spectra obtained before and after EMI suppression.

The comparison between frequency spectra obtained before and after EMI suppression is shown in FIG. 11. The standard of low electromagnetic noise can be met only in the case that an electromagnetic noise signal amplitude of any frequency on a full-frequency electromagnetic noise signal intensity line 115 is lower than an allowed threshold line 116. In the absence of the EMI suppression design, the electromagnetic noise signal amplitudes at many frequencies are higher than the threshold line 116, which does not meet the standard of low electromagnetic noise. After the EMI suppression design is introduced, the electromagnetic noise signal intensities of all frequencies are lower than the threshold line 116, which meets the standard of low electromagnetic noise.

With respect to the wireless power transfer device provided herein, a high-frequency AC cable with a special structure is provided to increase transmission impedance of a transient switching frequency and the harmonics of the transient switching frequency of the power conversion circuit and suppress electromagnetic interference signal of the transient switching frequency and the harmonics of the transient switching frequency of the power conversion circuit. In addition, an ECD with a stable potential, which is electrically connected to a low-AC impedance DC plane of the power conversion circuit, is provided for a wireless power transfer coil group such that a potential of the wireless power transfer coil group assembly is stabilized, and the harmonics of the AC circuit other than the fundamental waveform of the power conversion circuit is suppressed, greatly weakening the related EMI. As a consequence, the disclosure greatly increases the high-frequency AC impedance and reduces the EMI signal, thereby effectively solving the problem caused by EMI.

Described above are merely preferred embodiments of the disclosure, which are not intended to limit the disclosure. It should be understood that any changes, modifications, replacements and variations made by those of ordinary skill in the art without departing from the spirit of this application shall fall within the scope of this application defined by the appended claims.

What is claimed is:

1. A wireless power transfer device with EMI suppression, comprising:
   a power conversion circuit board;
   a wireless power transfer coil group assembly comprising a coil; and
   an eddy current damper (ECD) with a stable electric potential, the ECD being made of a conductive material,
   wherein the power conversion circuit board is connected to the wireless power transfer coil group assembly through a high-frequency power cable; the ECD is close to the wireless power transfer coil group assembly; and the ECD is connected to a low-alternating current (AC) impedance direct current (DC) plane of the power conversion circuit board through a conductor, and
   wherein a maximum projection length (D) of the ECD along an axial line of the coil of wireless power transfer coil group assembly is greater than or equal to ⅛ of a maximum projection length (d) of the coil, and a distance (s) between a geometric center of the ECD and the axial line of the coil is less than or equal to the maximum projection length (d) of the coil.

2. The wireless power transfer device of claim 1, wherein the high-frequency power cable comprises at least one basic unit for low-loss transmission of high-frequency AC; and a space of each of the at least one basic unit constitutes an inductance-capacitance low-pass filter.

3. The wireless power transfer device of claim 2, wherein each of the at least one basic unit comprises at least one forward high-frequency low-loss wire and at least one reverse high-frequency low-loss wire; a spatial structure between the at least one forward high-frequency low-loss wire and the at least one reverse high-frequency low-loss wire is a parallel structure, a twisted structure, a stranded structure, a knitted structure, a spiral structure or a combination thereof;
   the at least one forward high-frequency low-loss wire and the at least one reverse high-frequency low-loss wire are respectively connected in series to the wireless power transfer coil group assembly; and
   the number of the at least one forward high-frequency low-loss wire is different from that of the at least one reverse high-frequency low-loss wire; the at least one forward high-frequency low-loss wire and the at least one reverse high-frequency low-loss wire cling to each other to form a capacitor; and the inductance-capacitance low-pass filter formed by the space of each of the at least one basic unit is a distributed inductance-capacitance low-pass filter configured to suppress electromagnetic interference (EMI).

4. The wireless power transfer device of claim 2, wherein each of the at least one basic unit comprises at least one forward high-frequency low-loss wire, a magnetic conductive material and at least one reverse high-frequency low-loss wire; a spatial structure between the at least one forward high-frequency low-loss wire and the magnetic conductive material and the at least one reverse high-frequency low-loss wire is a parallel structure, a twisted structure, a stranded structure, a knitted structure, a spiral structure or a combination thereof; the at least one forward high-frequency low-loss wire and the at least one reverse high-frequency low-loss wire are respectively connected in series to the wireless power transfer coil group assembly; the at least one forward high-frequency low-loss wire and the at least one reverse high-frequency low-loss wire cling to each other to form a capacitor; and the inductance-capacitance low-pass filter formed by the space of each of the at least one basic unit is a distributed inductance-capacitance low-pass filter unit configured to suppress EMI.

5. The wireless power transfer device of claim 4, wherein the magnetic conductive material has electrical conductivity.

6. The wireless power transfer device of claim 2, wherein each of the at least one basic unit comprises a forward high-frequency low-loss wire, a conductive material and a reverse high-frequency low-loss wire; a spatial structure between the forward high-frequency low-loss wire, the conductive material and the reverse high-frequency low-loss wire is a parallel structure, a twisted structure, a stranded structure, a knitted structure, a spiral structure or a combination thereof; the forward high-frequency low-loss wire and the reverse high-frequency low-loss wire are respectively connected in series to the wireless power transfer coil group assembly; the forward high-frequency low-loss wire and the reverse high-frequency low-loss wire cling to each other to form a capacitor; the conductive material is configured to increase a capacitance of the capacitor; and the inductance-capacitance low-pass filter formed by the space of each of the at least one basic unit is a distributed inductance-capacitance low-pass filter configured to suppress EMI.

7. The wireless power transfer device of claim 6, wherein the conductive material has soft magnetic properties.

8. The wireless power transfer device of claim 1, wherein the wireless power transfer coil group assembly further comprises a magnetic conductive material with an alternating magnetic field for guiding wireless charging; and the coil, the magnetic conductive material and the ECD are provided close to each other.

9. The wireless power transfer device of claim 8, wherein the magnetic conductive material is provided above the ECD; the coil is provided above the magnetic conductive material; the coil, the magnetic conductive material and the ECD are approximately coaxially arranged.

10. The wireless power transfer device of claim 8, wherein the ECD adopts a sector-shaped structure with the same axis as the coil; the coil is provided below the ECD; the magnetic conductive material is provided below the coil; the coil, the magnetic conductive material and the ECD are arranged approximately coaxially.

11. The wireless power transfer device of claim 8, wherein the ECD adopts a sector-shaped structure with the same axis as the coil; the coil is provided above the ECD; the magnetic conductive material is provided below the ECD; and the coil, the magnetic conductive material and the ECD are approximately coaxially provided.

12. The wireless power transfer device of claim 8, wherein the ECD is a long-line conductive material; the ECD is wound on or clings to a side of wire/wires of coil; the magnetic conductive material is closely provided below the ECD and the coil; and a length L of the ECD is greater than or equal to ⅛ of a length of the wire of the coil.

13. The wireless power transfer device of claim 1, further comprising:
   at least one filter circuit board;
   wherein the at least one filter circuit board is electrically connected to the power conversion circuit board, the wireless power transfer coil group assembly and the high-frequency power cable; the at least one filter circuit board is configured to remove high-frequency EMI noise of wireless charging to suppress EMI; the at least one filter circuit board is electrically connected between the power conversion circuit board and the high-frequency power cable; the at least one filter circuit board is electrically connected between a plurality of adjacent high-frequency power cables; and the at least one filter circuit board is electrically connected between the wireless power transfer coil group assembly and the high-frequency power cable.

14. The wireless power transfer device of claim 8, wherein the coil comprises at least one sub-coil; the power conversion circuit board is provided with a bridge circuit; each of the at least one sub-coil is provided with two leads for electrically connecting with the bridge circuit;

an output terminal of the bridge circuit is electrically connected to the at least one sub-coil in series through a capacitor; one lead of each of the at least one sub-coil is electrically connected to the bridge circuit; and the other lead of each of the at least one sub-coil is provided on an outer side of a projection of each of the at least one sub-coil along an axis and is connected to the capacitor.

15. The wireless power transfer device of claim 8, wherein when the wireless power transfer coil group assembly is powered, an eddy current is generated on the LCD and a reverse alternating magnetic field is generated, causing the current of the higher-frequency power cable and the EMI to be suppressed.

\* \* \* \* \*